United States Patent [19]

Ogawa et al.

[11] 4,108,652
[45] Aug. 22, 1978

[54] METHOD FOR PRODUCING A SINTERED BODY OF HIGH DENSITY

[75] Inventors: Kazuki Ogawa, Fukuoka; Mitsue Koizumi, Toyonaka; Mitsuhiko Furukawa, Fukuoka; Yoshimichi Hara, Fukuoka; Takashi Kitahira, Fukuoka, all of Japan

[73] Assignee: Nippon Tungsten Co., Ltd., Fukuoka, Japan

[21] Appl. No.: 715,082

[22] Filed: Aug. 17, 1976

[51] Int. Cl.² ............................ B22F 1/04; B22F 3/14
[52] U.S. Cl. ........................................ 75/223; 75/226; 75/208 R; 264/62; 264/56; 428/558; 428/74
[58] Field of Search ...................... 75/226, 223, 208 R, 75/221, 225; 264/111

[56] References Cited

U.S. PATENT DOCUMENTS

| | | | |
|---|---|---|---|
| 3,474,516 | 10/1969 | Finlay et al. | 75/226 |
| 3,599,281 | 8/1971 | Boyen | 75/214 |
| 3,728,111 | 4/1973 | Stromblad et al. | 75/226 |
| 3,982,934 | 9/1976 | Wentzell | 75/214 X |
| 3,986,870 | 10/1976 | Danieli et al. | 75/226 |

Primary Examiner—Benjamin R. Padgett
Assistant Examiner—Josephine Lloyd
Attorney, Agent, or Firm—Frank J. Jordan

[57] ABSTRACT

A new hot isostatic pressing method produces sintered material having a very fine structure as well as uniform properties by forming a unique capsule such as a titanium capsule of metal over a presintered material for sintering a ceramic cutting tool material is disclosed.

30 Claims, 11 Drawing Figures (a)

(b)

(c)

METHOD FOR PRODUCING A SINTERED BODY OF HIGH DENSITY

BACKGROUND OF THE INVENTION

This invention relates to an improvement of the hot isostatic pressing method (this method is hereinafter referred to as the HIP method), a remarkable development of recent years, wherein the improvement comprises a new HIP method which employs a unique capsule for sintering.

In general, hot pressing methods can be divided into two main classes; namely, the normal hot pressing method and the hot isostatic pressing method.

The hot pressing method is one of the effective methods for sintering materials, thus producing a sintered body of high density.

In the above method, however, since the material is pressed in only one direction, the particles of the sintered body tend to be arranged in the same direction. Namely, when the sintering is completed, the sintered body shows differing mechanical and physical properties in the vertical plane and in the horizontal plane thereof relative to the pressing direction.

As a sintering method which removes the above anisotropy, the HIP method has been developed wherein the material is uniformly compressed making use of a gaseous body(mainly inert gas) as a pressure medium, while the material is heated.

The conventional HIP method is conducted in such a way that powder is loaded into capsules of sheet metal standing on a hydraulic vibrating table which can be lowered. The capsules are then sealed by welding covers to their open ends. The particles have a very small contact area and therefore the powder has extremely poor thermal conductivity. Therefore it is cold-compacted at a range of from 400 to 1,000 kg/cm$^2$. After compacting, the capsules are evacuated in a conventional furnace at 400°–500° C, closed and heated to the required final temperature.

Furthermore, when the powder-like material, which, in general, contains large amounts of absorbed gas, is charged into the capsule made of metal plates and degassed, and subsequently the capsule is sealed in an air-tight manner, due to heating during the HIP operation, gas adhering to the power-like material is dispelled from the material and remains within the capsule, ill-affecting the various properties of a sintered body.

Reviewing the above disadvantages of the conventional HIP method, a method which undertakes a pre-operation before conducting the HIP operation can be considered wherein the pre-operation comprises shaping the powder-like material into the desired form, and subsequently sintering the material by the ordinary method or by the hot pressing method whereby gas adhering to the powder-like material is expelled from the material and thus produces a sintered body almost entirely free from apertures or holes as heretofore.

In general, the size of the particles which form a sintered body is influenced by the sintering temperature such that the size increases corresponding to the elevation of the sintering temperature. However, a sintered body demonstrates greater strength when the component particles are sintered finely and densely.

In the production of ceramics, which require high density thereof, it is desirable that the material be sintered at a low temperature so that the grain growth of component is restricted.

However, as far as the conventional sintering method is concerned, when the material is sintered at a low temperature, the sintered body may still contain a considerable amount of pores therein although the grain growth of component particles can be supressed and gas adhering to the powder-like material can be removed.

It is impossible to directly sinter the porous sintered body by the HIP method, since high pressure gas infiltrates to the inside of the sintered body.

Accordingly, a method for increasing the density of a sintered body which comprises coating the surface of the porous pre-sintered body with glass and subsequently compressing the coated presintered body by means of high pressure gas has been developed.

However this method, which utilizes glass, is restricted in its use thereof in view of the components of the sintered body and the glass material. Namely, alkaline earth metal or $SiO_2$, which is contained within glass, reacts with the sintered body, greatly influencing the properties of the sintered body. Furthermore, glass melts during heating and flows downward whereby the glass coating layer can not be kept at a uniform thickness over the entire surface of the sintered body. As has been described heretofore, the selection of the capsule which coats the sintered body is of great significance in making full use of the HIP method.

It is therefore an object of the present invention to provide an HIP method for producing a sintered body of high density which is characterized in its use of a desired metal powder such as titanium as the material for the capsule.

It is another object of the present invention to provide a capsule used in the above HIP method wherein the capsule which is composed of pure titanium and has a uniform thickness of more than 8 micron is formed over the entire surface of the pre-sintered material.

It is still another object of the present invention to provide a method for forming a pure titanium capsule which is uniform in thickness over the entire surface of a pre-sintered material.

The novel features which are considered characteristic of the invention are set forth with particularity in the appended claims.

The invention, itself, however, and additional objects and advantages thereof will best be understood from the following description of embodiments thereof when read in connection with the accompanying drawings and photographs.

BRIEF DESCRIPTION OF THE DRAWINGS

FIG. 4(a) through FIG. 4(c) are photomicrographs showing the result obtained by X-ray microanalyzer analysis wherein FIG. 4(a) shows the diffusion condition of titanium into the sintered body, FIG. 4(b) detects Kα line of titanium and FIG. 4(c) detects the Kα line of aluminum.

DETAILED DESCRIPTION OF THE INVENTION

Figure 1:
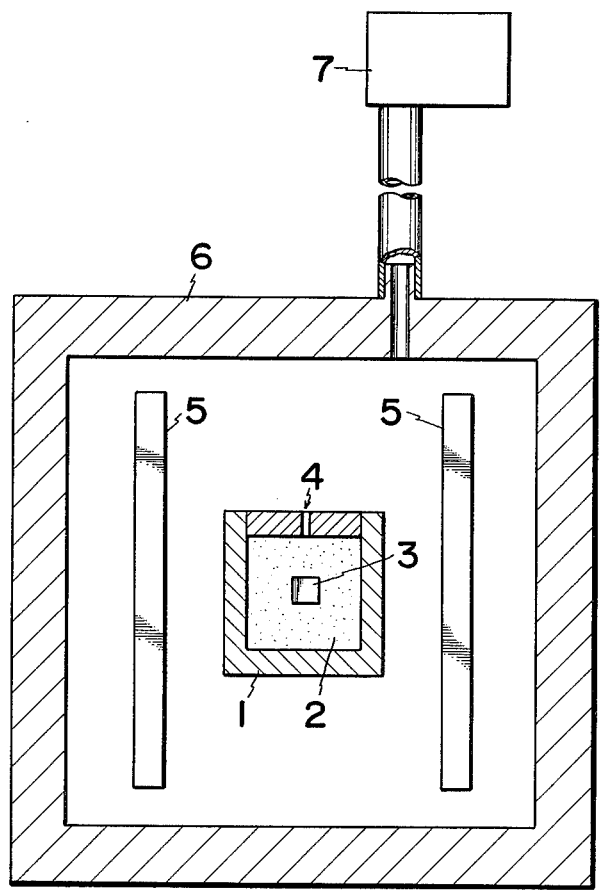
FIG. 1 is an explanatory view showing the first step of the method of this invention.

The system used for the method of this invention is described shematically in FIG. 1 wherein numeral 1 indicates a mold made of a material having a high melting point such as graphite, numeral 2 indicates a packed mixed body composed of a metal powder, ammonium chloride and crushed refractory material, numeral 3 indicates a pre-sintered body, numeral 4 indicates an aperture formed in the cover of the mold for evacuating gas from within the mixed body, numeral 5 indicates heating means, numeral 6 indicates a furnace and numeral 7 indicates a vacuum pump.

According to one embodiment, a method of this invention for producing a sintered body of high density thereof substantially comprises the following steps:

first step: packing or charging the packing material which is a mixed body of metallic titanium, ammonium chloride and refractory material crushed into a graphite mold such that the material encloses the entire periphery of the pre-sintered material and disposing the graphite mold in a vacuum furnace and heating the packing material until the titanium, having a thickness of 8 micron, is extracted over the surface of the sintered body such that the above extracted titanium forms a titanium capsule;

second step: disposing the capsule-coated body obtained from the first step into a heating furnace and filling the heating furnace with a fluid pressure medium such as nitrogen or an inert gas such as argon;

third step: keeping the atmosphere within the furnace at a desired temperature and desired pressure so as to compress the pre-sintered material at high temperature by way of the titanium capsule.

In the above method, the capsule which is composed of titanium, having a uniform thickness of more than 8 micron, is formed over the entire surface of a pre-sintered material such as a ceramic.

The titanium particles used in this invention have a size smaller than 100 mesh.

The reason for the above size determination is that the reaction of titanium, when a capsule is formed, is improved when the capsule has as large a surface area as possible.

It is also desirable that the ammonium chloride and the refractory material powder have as small a size as possible as long as their permeability is not hampered.

The reason for the uniformity in thickness of the capsule over the entire surface area lies in that the pre-sintered material must be subject to uniform pressure and temperature during HIP treatment wherein the defining of the thickness of the capsule as more than 8 micron is due to the fact that it may rupture due to contraction at the time of HIP or may result in a cut therein which eventually exposes the surface of the pre-sintered material when the thickness of the capsule is less than 8 micron whereby HIP cannot be conducted.

With respect to the pre-sintering conducted in the method for producing a sintered body of high density of this invention, material to be pre-sintered preferably has over 80 percent of the theoretical density so that later, main sintering can be effectively conducted.

Pre-sintering is carried out to facilitate the shaping of the pre-sintered body in the desired complicated shape while the body is still soft as well as for the minimization of the rupture of the titanium coating(capsule) which may occur through contraction thereof during HIP treatment.

This invention employs neither the vacuum vapor coating method nor the gilding method for the application of a titanium coating over the surface of the pre-sintered body.

The reason is that the former method necessitates a fulcrum point on the surface of the pre-sintered body at which point the vapor coating cannot be applied. It is also extremely difficult to form a uniform vapor coating over the surface of material using the above method when the size of the material is considerably large and furthermore, it is substantially impossible to form a coating of a thickness of more than 8 micron. (If the coating is conducted for a long period of time, sufficient thickness may be achieved. However, since the adhering strength of the coating is rather low, the coating is of no use.) The latter method produces a titanium coating which lacks air-tightness.

The method of this invention uses ammonium chloride and refractory material powder besides titanium in the first step thereof. Of course, other chlorides such as KCl can be used in place of ammonium chloride in the method of this invention. They are used for their advantages wherein ammonium chloride forms $TiCl_4$ after reacting with titanium in the furnace and subsequently pure titanium which also has a uniform grain size is extracted therefrom onto the surface of the material to be sintered while the refractory material powder is employed for easing the removal of the sintered body from the packing material such as titanium and ammonium chloride after the titanium components adhere to each other and then form a capsule around the surface of the pre-sintered body.

Unless the refractory material powder is packed, the packing material is solidified so that the operation to crack the packing material for removing the sintered body becomes a necessity which may cause a cut on the surface of the capsule. Therefore the refractory material powder is chosen such that the titanium does not positively adhere to it.

The method of this invention uses nitrogen gas or an inert gas in the second step thereof wherein an inert gas is employed for preventing the capsule from reacting with the gas during the HIP operation, the purpose of which is to achieve the complete sintering of the pre-sintered body, such as a ceramic body, while nitrogen gas is employed such that, contrary to the effects of the inert gas, the nitrogen gas reacts with titanium so that a fine, dense TiN layer, which improves the working of the capsule, and there is formed a sintered body having the remaining titanium layer around the entire surface of the sintered body which can be practically used.

The remaining TiN around the surface of the sintered body is effective when, for example, a workpiece which is made of $Al_2O_3$ must be cut by a worktool which is produced by the above method wherein TiN cuts the workpiece more effectively. Examples of this invention are hereinafter disclosed.

FIRST EXAMPLE

Test piece: 99.5 wt% $Al_2O_3$ — 0.5 wt% MgO.

This test piece was pre-sintered by an ordinary sintering method until the density thereof became 93.5% of the theoretical density wherein the size of the test piece was 8.5 mm × 2.5 mm × 3.7 mm.

Figure 2:
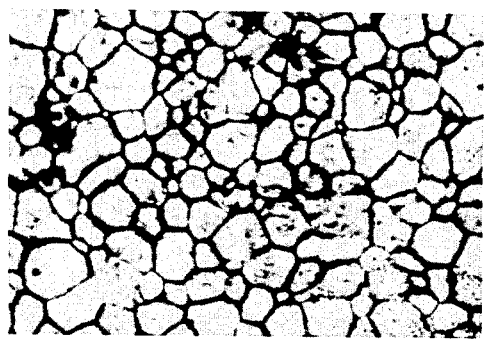
FIG. 2 is a microphotograph at ×400 magnification of the surface structure of the titanium coating.
Figure 3:
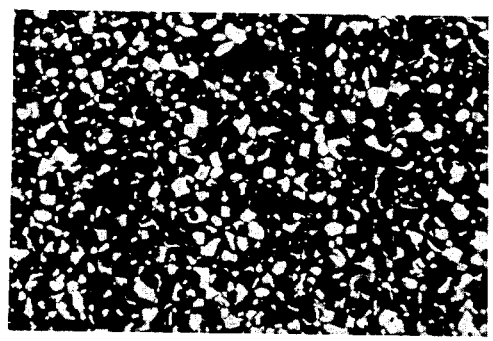
FIG. 3 is a microghotograph at ×400 magnification of the surface of the chromium coating.

The above processed test piece was placed within a graphite mold and titanium powder, ammonium chloride powder and $Al_2O_3$ powder were packed in the mold such that it covered the entire surface of the test piece. Other metal powder such as chromium powder can be used in place of titanium. Then the test piece was treated in a vacuum of $10^{-4}$ Torr and at a temperature of 1350° C for three hours. As a result, a titanium coating having a thickness of 25 micron was formed uniformly over the entire surface of the test piece. FIG. 2 is a photomicrograph at ×400 showing the surface structure of the titanium coating. FIG. 3 is another photomicrograph at ×400 showing the surface structure of chromium coating which has a finer grain size than titanium.

SECOND EXAMPLE

Test piece: 70 wt% $Al_2O_3$—30 wt% TiC.

The test piece was pre-sintered by a hot press method until the density thereof became 93% of the theoretical density wherein the size of the test piece was 8.5 mm × 2.5mm × 3.7mm.

The above processed test piece was placed within a graphite mold and then titanium powder, ammonium chloride powder and $Al_2O_3$ powder were packed in the mold such that it covered the entire surface of the test piece. Then the test piece, while being placed in the mold, was treated in a vacuum of $10^{-4}$ Torr and at a temperature of 1300° C for 2 hours.

As the result, a titanium coating having a thickness of 20 micron was formed uniformly over the entire surface of the test piece.

THIRD EXAMPLE

The test piece which was obtained by the first Example was placed in a hot isostatic pressing device and was subjected to an argon gas atmosphere at a temperature of 1400° C and a pressure of 1600 kg/cm² for 40 minutes and then was removed from the device.

Subsequently a diamond cutter removed the capsule or the coating from the surface of the test piece. The thus obtained product (test piece) displayed high density thereof which was 99% of the theoretical density and the $Al_2O_3$ crystal particles thereof were also extremely fine and uniform. The hardness thereof was $H_rA$ 94.

FOURTH EXAMPLE

The test piece obtained by the second Example was placed in a hot isostatic pressing device and was subject to a nitrogen gas atmosphere at a temperature of 1450° C and at a pressure of 1600 kg/cm² for 40 minutes and then was removed from the device.

The thus treated test piece was covered uniformly over its entire surface thereof by a fine TiN layer. This TiN layer displayed a density which was 99% of the theoretical density and the surface hardness thereof was $H_rA$ 93.5.

As has been described previously this TiN layer is effective in cutting a workpiece composed of $Al_2O_3$. $Al_2O_3$ crystal particles of the sintered body also were extremely fine and uniform.

The evaluation data of the following Table 1 was obtained upon the testing of various HIP treatments on test pieces, all of which were composed of 99.5 wt% $Al_2O_3$ and 0.5 wt% of MgO.

Table 2 shows the evaluation data obtained when the capsule is made of other material.

Table 1

| test piece | pre-sintered body relative humidity (%) | capsule coating | condition for HIP temp. (°C) | pressure (kg/cm²) | time (min.) | physical properties relative humidity (%) | hardness ($H_RA$) |
|---|---|---|---|---|---|---|---|
| 99.5$Al_2O_3$ 0.5MgO | 75 | titan coating | 1350 | 1600 | 40 | 80.0 | — |
| " | 75 | " | 1400 | 1600 | 40 | 90.0 | — |
| " | 75 | " | 1450 | 1600 | 40 | 90.0 | — |
| " | 80 | " | 1350 | 1600 | 40 | 85.0 | 93.5 |
| " | 80 | " | 1400 | 1600 | 40 | 99.0 | 93.5 |
| " | 80 | " | 1450 | 1600 | 40 | 99.0 | 91.5 |
| " | 85 | " | 1350 | 1600 | 40 | 94.0 | 94.5 |
| " | 85 | " | 1400 | 1600 | 40 | 99.1 | 94.3 |
| " | 85 | " | 1450 | 1600 | 40 | 99.2 | 94.3 |
| " | 85 | non-coating | 1450 | 1600 | 40 | 87.2 | — |
| " | 90 | titan coating | 1350 | 1600 | 40 | 95.0 | 91.5 |
| " | 90 | " | 1400 | 1600 | 40 | 99.3 | 94.4 |
| " | 90 | " | 1450 | 1600 | 40 | 99.3 | 94.4 |
| " | 90 | non-coating | 1450 | 1600 | 40 | 92.5 | — |

Table 2

| test piece | pre-sintered body relative humidity (%) | capsule coating | condition for HIP temp. (°C) | pressure (kg/cm²) | time (min.) | physical properties relative humidity (%) | hardness ($H_RA$) |
|---|---|---|---|---|---|---|---|
| 99.5$Al_2O_3$ 0.5MgO | 90 | Zr coating | 1430 | 1500 | 40 | 99.1 | 93.5 |
| " | 90 | HF coating | " | " | " | 99.2 | 93.3 |
| " | 90 | Nb coating | " | " | " | 99.2 | 93.2 |
| " | 90 | Ta coating | " | " | " | 99.2 | 93.2 |
| " | 90 | Cr coating | " | " | " | 99.3 | 93.8 |

Table 2-continued

| test piece | pre-sintered body relative humidity (%) | capsule coating | condition for HIP | | | physical properties | |
|---|---|---|---|---|---|---|---|
| | | | temp. (° C) | pressure (kg/cm²) | time (min.) | relative humidity (%) | hardness ($H_RA$) |
| " | 90 | W coating | " | " | " | 99.2 | 93.2 |
| " | 90 | Fe coating | " | " | " | 99.2 | 93.5 |
| " | 90 | Co coating | " | " | " | 99.3 | 93.7 |
| " | 90 | Ni coating | " | " | " | 99.3 | 93.7 |
| " | 90 | Mo coating | " | " | " | 99.3 | 93.5 |

As can be judged from the results shown in Table 1 and Table 2 and from each Example described heretofore, the desired heating temperature and heating time in the third step of the method are preferably 1350° – 1450° C and about 40 minutes respectively.

When the heating temperature in the first step for forming a titanium capsule is considerably low, the formation of a titanium layer of a thickness of more than 8 micron requires quite a long heating time, while when the heating temperature is too high, the formed titanium capsule is composed of coarse titanium grain particles, resulting in low density thereof.

Therefore, the optimal values for heating temperature and for heating time are about 1200° – 1450° C and about two hours respectively.

Figure 4:
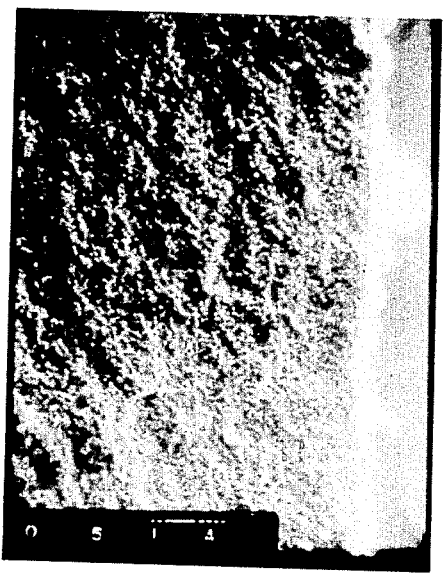
Figure 4:
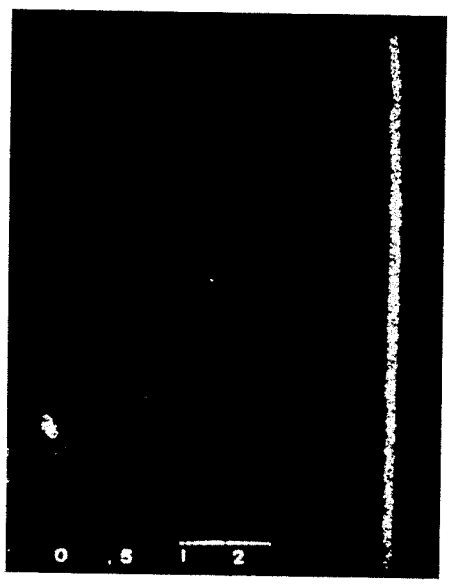
Figure 4:
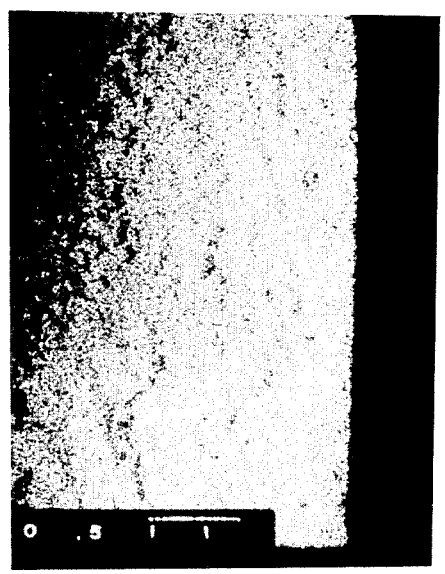

For the purpose of checking the diffusion of the titanium coating, which was formed in the first step of this invention, on the sintered body, a test piece which consisted of 99.5wt% MgO and which had a titanium coating around the entire surface thereof, was checked by X-ray micro-analyzer analysis wherein the diffusion conditions are shown in FIG. 4a, FIG. 4b and FIG. 4c.

The device used in the above analysis is an X-ray micro-analyzer JXA-50A, a product of Nihon Electronics, Co., Ltd. of Japan.

In the above pictures, a white point shows the detected element.

FIG. 4a shows a cross-section of the test piece, FIG. 4b shows a Kαline of titanium and FIG. 4c shows a kαline of aluminium.

As can be clearly observed in FIG. 4a through FIG. 4c, almost no titanium diffused into the sintered body.

Figure 5:
FIG. 5 is a scanning electronmicrophotograph at ×3000 magnification of the cracked surface of the sintered body obtained by the third embodiment.

FIG. 5 is a microphotograph showing the structure of the cracked surface of the sintered body produced by the third Example and is provided for checking the sintering condition of the test piece processed by the HIP treatment of this invention.

Figure 6:
FIG. 6 is a scanning electronmicrophotograph at ×3000 magnification of the cracked surface of the sintered body obtained by the cold press method.

FIG. 6 is a microphotograph showing the structure of the cracked surface of a sintered body which has the same composition as that of test piece which was used in the third Example and which was sintered by a cold press method (this method is conducted such that after the powder was molded at a pressure of 1200 kg/cm², the molded powder was subject to temperatures of 1650° C for two hours.). The microphotograph is provided for comparison with FIG. 5.

Figure 7:
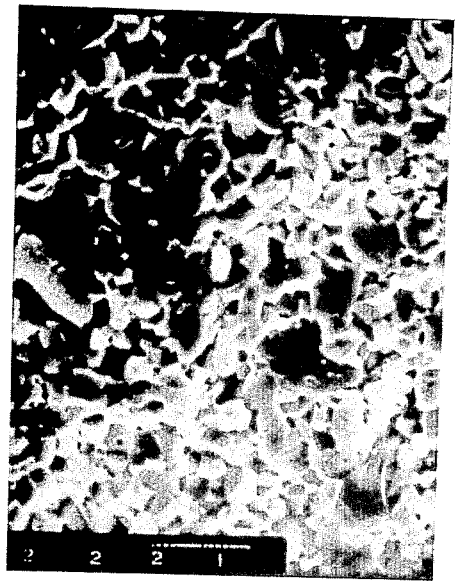
FIG. 7 is a scanning electronmicrophotograph at ×3000 magnification of the cracked surface of the sintered body obtained by the conventional HIP method which utilizes a glass tube capsule.

FIG. 7 is also provided for comparison with FIG. 5 wherein FIG. 7 is a microphotograph showing the structure of the crushed surface of a sintered body which was obtained by sintering a test piece which had the same composition as the test piece used in the third embodiment by the conventional HIP method. This method is conducted such that after the desired pre-sintering, the test piece was wrapped by a platinum foil and was inserted into a glass tube and was vacuum-sealed and subsequently the entire structure was heated under a comparatively low gas pressure to the softening temperature of the glass and finally was processed at a pressure of 1600 kg/cm² and a temperature of 1450° C by HIP treatment.

As can be observed from above microphotographs, the sintered body (FIG. 6) which was sintered by a cold press method was composed of $Al_2O_3$ particles which had greatly grown so that it displayed low hardness and low bending rupture strength, whereas the crystal particles of the sintered body (FIG. 5) sintered by the HIP treatment of this invention were fine and dense and furthermore each particle showed a uniform and round structure so that the sintered body showed high hardness and high bending rupture strength.

The following Table 3 shows the hardness and relative density of the above mentioned three kinds of sintered bodies.

Table 3

| | hardness ($H_RA$) | density relative to theoretical density |
|---|---|---|
| sintered body shown in Fig. 5 | 93.5 | 98.7 |
| sintered body shown in Fig. 6 | 94.0 | more than 99.0 |
| sintered body shown in Fig. 7 | 94.0 | more than 99.0 |

As can be observed by the microphotograph of FIG. 7 and the above Table 3, the body sintered by the conventional HIP method which utilized glass tube shows a structure and characteristics which do not differ in comparison with the sintered body produced by the method of this invention.

However this conventional method has the disadvantages that the method requires complicated processing steps and a sintered body which requires a complicated shape thereof cannot be obtained.

The capsule of this invention is easily formed onto a sintered body having any complex configuration or contour and furthermore, the capsule uniformly coats the entire surface of the sintered body so that the capsule is most suitable for HIP treatment.

Furthermore, since the titanium coating is uniform and fine, complete gas-tightness can be achieved.

Still further, according to the method of this invention, the step for forming a capsule for the HIP method is easily conducted and a sintered body of any desired size and shape can be produced and the thus obtained product (sintered body) has high density and high hardness thereof.

The physical properties of test pieces are described in the following Table 4.

Table 4

| | | Physical Properties of Test Pieces | | |
|---|---|---|---|---|
| | | density (g/cm³) | hardness ($H_RA$) | transverse rupture strength(kg/mm²) |
| cold press sintered $Al_2O_3$ | | 3.93–3.95 | 93–93.5 | 65 |
| hot press sintered | A | 3.98–4.00 | 93–94 | 75 |

Table 4-continued

| | | Physical Properties of Test Pieces | | |
|---|---|---|---|---|
| | | density (g/cm$^3$) | hardness (H$_R$A) | transverse rupture strength(kg/mm$^2$) |
| Al$_2$O$_3$ hot press sintered | B | 3.98–4.00 | 92–93 | 60 |
| Al$_2$O$_3$--TiC hot isostatic press sintered | | 4.22–4.25 | 94–95 | 90 |
| Al$_2$O$_3$ | | 3.95–3.99 | 94–95 | 80 |

Figure 8:
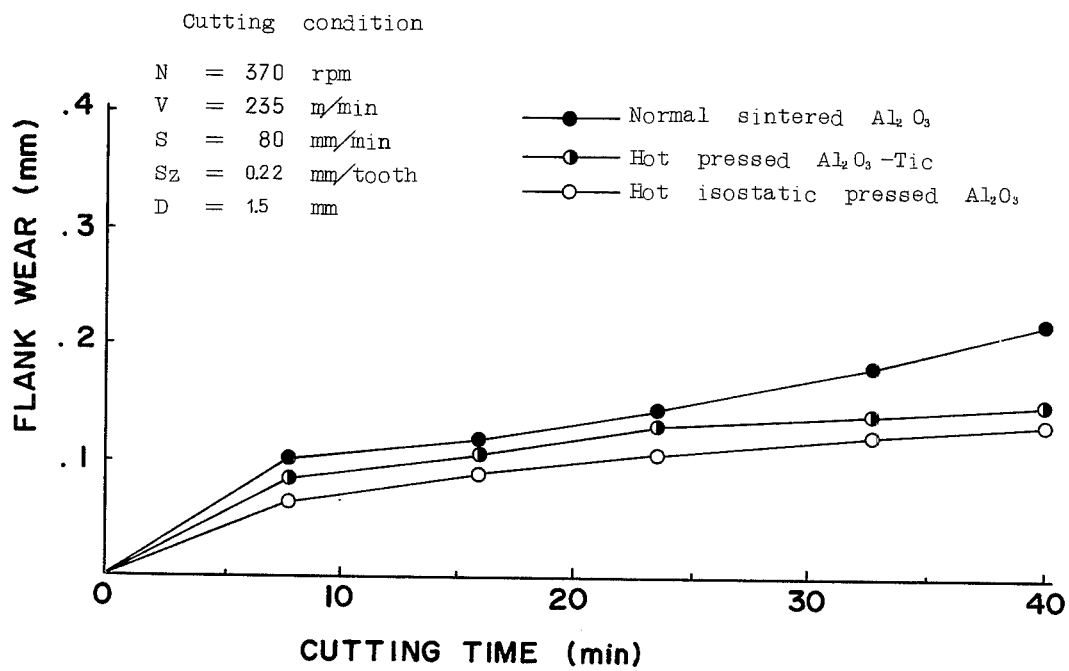
FIG. 8 is a performance chart of cutting tools produced by the respective methods showing the relationship between flank wear and cutting time.
Figure 9:
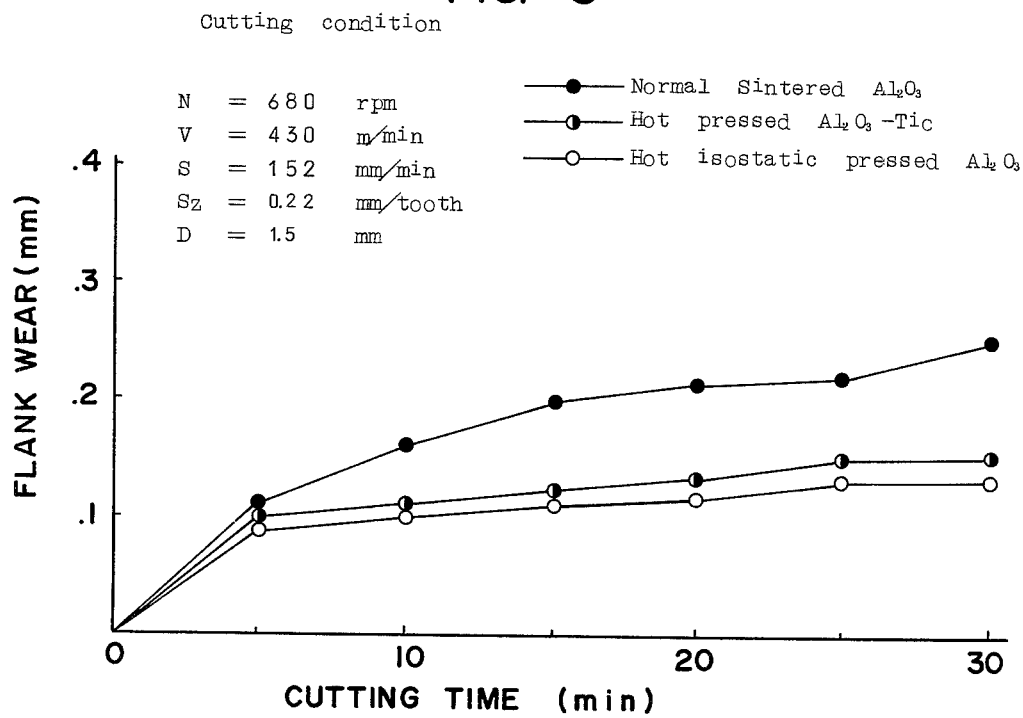
FIG. 9 is another performance chart of cutting tools produced by the respective methods.

In FIG. 8 and FIG. 9, the cutting performance of the cutting tool produced by the methods of this invention is compared with those of the cutting tools produced by other methods.

As can be easily understood from the drawings, a cutting tool produced by the method of this invention shows less flank wear compared to other cutting tools so that it can withstand long useage thereof.

What is claimed is:

1. A method for producing a sintered body of high density comprising the following steps:
   first step: packing a mixed body of a metal powder, a chloride salt and crushed refractory material into a mold which previously contains the pre-sintered body such that said mixed body covers the entire surface of said pre-sintered body, heating said mold until pure metal having a thickness of more than 8 micron is extracted over the surface of said pre-sintered body so that said extracted metal forms a capsule coating of said metal on said body;
   second step: disposing said capsule-coated body obtained from the first step into a heating furnace and filling said heating furnace with a fluid pressure medium such as a nitrogen gas or an inert gas; and
   third step: keeping the atmosphere within said furnace at a desired temperature and a desired pressure so as to compress said pre-sintered body at a high temperature by way of said metal-capsule.

2. A method for producing a sintered body according to claim 1 wherein said metal powder is titanium powder and said extracted metal is pure titanium.

3. A method for producing a sintered body according to claim 1 wherein said metal powder is chromium powder and said extracted metal is pure chromium.

4. A method for producing a sintered body according to claim 1 wherein said metal powder is zirconium powder and said extracted metal is pure zirconium.

5. A method for producing a sintered body according to claim 1 wherein said metal powder is hafnium powder and said extracted metal is pure hafnium.

6. A method for producing a sintered body according to claim 1 wherein said metal powder is niobium powder and said extracted metal is pure niobium.

7. A method for producing a sintered body according to claim 1 wherein said metal powder is tantalum powder and said extracted metal is pure tantalum.

8. A method for producing a sintered body according to claim 1 wherein said metal powder is tungsten powder and said extracted metal is pure tungsten.

9. A method for producing a sintered body according to claim 1 wherein said metal powder is iron powder and said extracted metal is pure iron.

10. A method for producing a sintered body according to claim 1 wherein said metal powder is cobalt powder and said extracted metal is pure cobalt.

11. A method for producing a sintered body according to claim 1 wherein said metal powder is nickel powder and said extracted metal is pure nickel.

12. A method for producing a sintered body according to claim 1 wherein said metal powder is molybdenum powder and said extracted metal is pure molybdenum.

13. A capsule composed of fine pure metal particles which are extracted from a chloride salt; said capsule formed uniformly around the entire surface of a pre-sintered body and having a thickness of more than 8 micron.

14. A capsule according to claim 13, wherein said pure metal is pure titanium.

15. A capsule according to claim 13, wherein said pure metal is pure chromium.

16. A capsule according to claim 13, wherein said pure metal is pure zirconium.

17. A capsule according to claim 13, wherein said pure metal is pure hafnium.

18. A capsule according to claim 13, wherein said pure metal is niobium.

19. A capsule according to claim 13, wherein said pure metal is pure tantalum.

20. A capsule according to claim 13, wherein said pure metal is pure tungsten.

21. A capsule according to claim 13, wherein said pure metal is pure iron.

22. A capsule according to claim 13, wherein said pure metal is pure cobalt.

23. A capsule according to claim 13, wherein said pure metal is pure nickel.

24. A capsule according to claim 13, wherein said pure metal is pure molybdenum.

25. A method according to claim 1 wherein said chloride salt is ammonium chloride.

26. A method according to claim 1 wherein said chloride salt is potassium chloride.

27. A method according to claim 1 wherein said metal powder has a particle size of less than 100 mesh.

28. A method according to claim 1 wherein said pre-sintered body is a ceramic material.

29. A method according to claim 1 wherein said heating in said first step is effected at a temperature of from 1200° to 1450° C.

30. A method according to claim 29 wherein said heating in said first step is effected for about 2 hours.

* * * * *